Sept. 17, 1963 R. KOBLER 3,104,288

TELEPHONE CALLING EQUIPMENT

Original Filed May 6, 1957 5 Sheets-Sheet 1

INVENTOR
Richard Kobler

BY George H. Fritzinger
Agt.

TELEPHONE CALLING EQUIPMENT

Original Filed May 6, 1957

INVENTOR
Richard Kobler
By George H. Fritzinger
Agt.

TELEPHONE CALLING EQUIPMENT

Original Filed May 6, 1957 5 Sheets-Sheet 3

INVENTOR
Richard Kobler
By George H. Fritzinger
Agt.

TELEPHONE CALLING EQUIPMENT

Original Filed May 6, 1957 5 Sheets-Sheet 4

INVENTOR
Richard Kobler
BY George H. Fritzinger
Agt.

Sept. 17, 1963 R. KOBLER 3,104,288

TELEPHONE CALLING EQUIPMENT

Original Filed May 6, 1957 5 Sheets-Sheet 5

INVENTOR
Richard Kobler
BY George H. Fritzinger
Agt.

United States Patent Office 3,104,288

Patented Sept. 17, 1963

3,104,288

TELEPHONE CALLING EQUIPMENT

Richard Kobler, West Orange, N.J., assignor to McGraw-Edison Company, Elgin, Ill., a corporation of Delaware

Continuation of application Ser. No. 657,378, May 6, 1957. This application May 1, 1963, Ser. No. 278,516
21 Claims. (Cl. 179—90)

This application is a continuation of my application Serial No. 657,378, filed May 6, 1957, and entitled Telephone Calling Equipment.

This invention relates to equipment which is electrically connectable to a subscriber's telephone set for automatically calling selected telephone numbers, and particularly it relates to such equipment having a recording-reproducing apparatus which is operable selectively for recording telephone numbers in code form and for reproducing the coded telephone numbers and recreating in the telephone line the same signal pulses as when a subscriber's telephone number is dialed directly.

As is well known, the letters and digits of subscribers' telephone numbers are represented by trains of current pulses, effected by a repeated break-make operation of a pulsing switch in the telephone circuit, as the respective letters and digits are dialed. For example, upon dialing the number "1" a single pulse is created, on dialing the number "2" or the letters "ABC" two pulses are created, on dialing the number "3" or the letters "DEF" three pulses are created, etc. These pulses are transmitted over voice frequency telephone lines to control automatic switching equipment for connecting the calling subscriber's line to the called subscriber's station equipment.

It is advantageous whenever a subscriber has need to make frequent calls from a list of telephone numbers that he be able to do so by a simple selective manipulation without having to read each telephone number and then transfer that number to an operator or dial the number directly with chance of making an error and getting the wrong party. However, in order that such automatic calling equipment may be practical it must not only have facility for storing a large list of coded telephone numbers but it must also be adapted to enable the numbers of such list to be readily changed and to enable numbers to be added as well as to be removed readily from the list.

Objects of my invention are to provide a new and improved automatic telephone calling machine which is connectable by electrical circuits to a subscriber's telephone set without need for any mechanical coupling therewith, which is adapted to permit the subscriber's telephone set to be operated in the regular way whenever the calling equipment is in a neutral or restored condition, which is capable of receiving and storing a long list of coded telephone numbers simply by conditioning the machine for recording, shifting a list finder bearing the names of the subscribers and dialing the subscribers' telephone numbers on the telephone set, which permits any recorded telephone number to be changed simply by re-dialing a new number when the list finder is set at the place of the old number, and which permits automatic calling of any of the recorded telephone numbers simply by setting the list finder to the selected number, picking up the telephone handset, and pressing a calling button.

Other objects are to provide such improved calling machine with apparatus for recording coded telephone numbers on a magnetic medium permitting the erasing and re-recording of telephone numbers as desired, to provide such machine wherein the magnetic medium is in the form of an elongate, flexible sheet or belt supported in a fashion to permit easy selection of recorded telephone numbers, and to provide such machine wherein the telephone numbers are recorded on successive lines crosswise of the sheet or belt, such recording machine being known as of the magnetic transversal type.

It is a further object to provide a telephone calling machine wherein coded telephone numbers are recorded on an elongate magnetizable record medium supported on rollers in the manner of a list finder, and wherein a particular call is made simply by shifting the list finder to the name of the subscriber to be called and then pressing a start button.

A further object is to provide a recording machine for the present purposes which is adapted to make efficient use of record space by completing interdigital unrecorded distances between successive pulse trains at a fixed satisfactory minimum independent of any delay on the part of the subscriber in selecting successive digits or in the clockwise wind-up of the dial during a dialing of the complete telephone number. A further object in this respect is to cause the recording operation to be started as an initial incident to releasing the dial and of causing the recording to continue only for a fixed interval after each return of the dial to its stop position.

As will appear, the feature of my invention of using a magnetic transversal machine for recording the coded telephone numbers on successive transverse lines on an erasable magnetic record medium permits not only the maximum in storage capability and in ease and simplicity of operation but also the maximum in simplicity and economy of apparatus. These and other objects and features of my invention will be apparent from the following description and the appended claims.

In the description of my invention reference is had to the accompanying drawings, of which:

Figure 7:
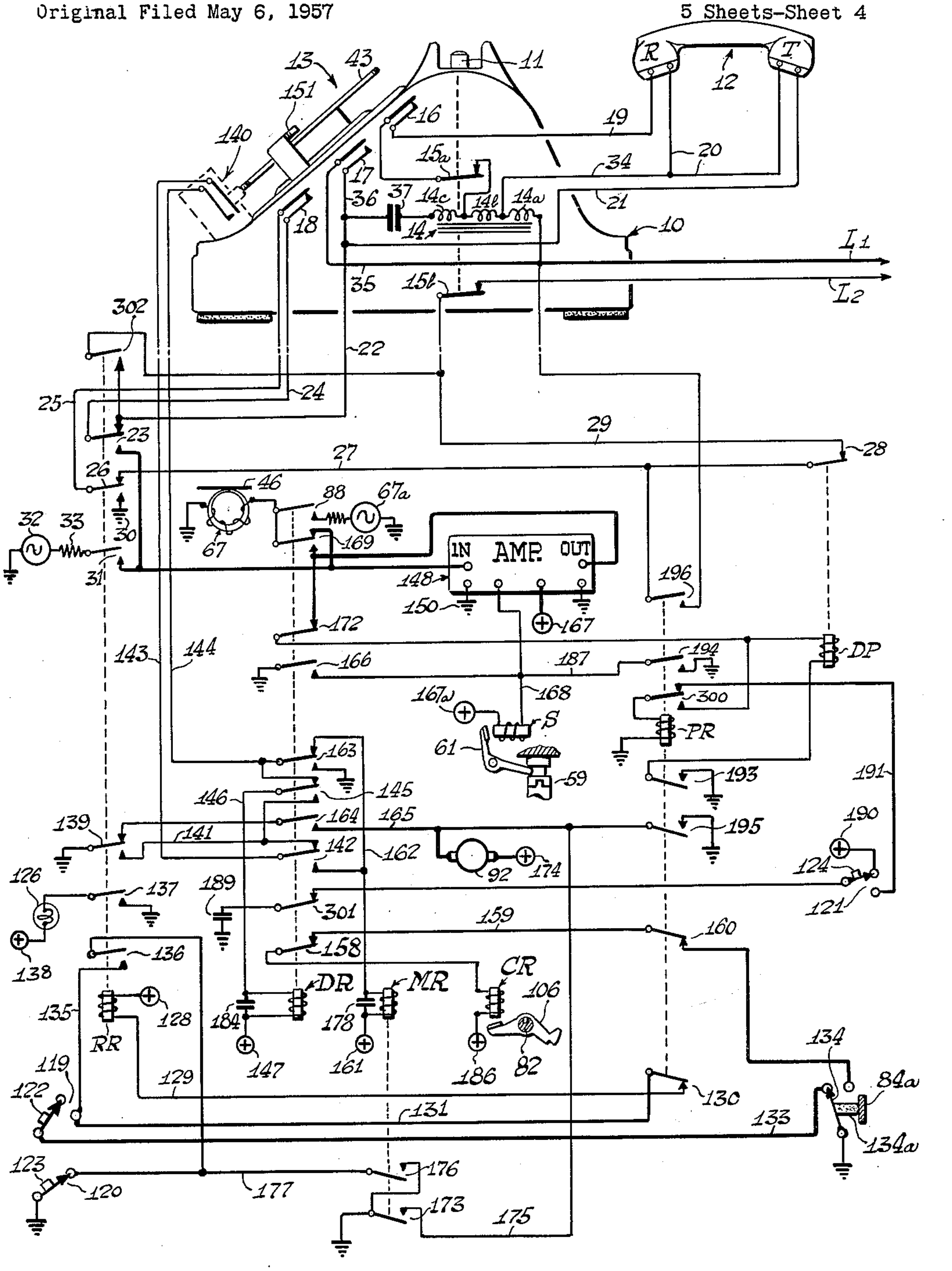
FIGURE 7 is a schematic diagram of circuits and components of a telephone set and of my automatic calling machine connected thereto.

A brief description of a standard telephone subscriber's set is first made with reference to the upper portion of the schematic diagram of FIGURE 7. There is here shown a telephone box 10 having a cradle 11 for supporting the usual handpiece 12 provided with a receiver R at one end and a transmitter T at the other. Journaled on the front face of this box is a dial 13. The station equipment, which is connected across the telephone lines $L_1$ and $L_2$, comprises a three-coil inductor 14 composed of sections 14*a*, 14*b* and 14*c* having a common magnetic circuit, two intercoupled cradle switches 15*a* and 15*b*, a dial-operated on-off switch 16, a dial-operated shunt switch 17, and a dial-operated pulsing switch 18. Connection is made from the line $L_1$ through the inductors 14*a* and 14*b*, cradle switch 15*a*, on-off switch 16, lead 19, receiver R, lead 20, transmitter T, lead 21, pulsing switch 18 and cradle switch 15*b* to the lead $L_2$, it being noted however that the last two connections are made through part of the automatic calling machine via lead 22, upper contact of switch 23, lead 24, pulsing switch 18, lead 25, upper contact of switch 26, lead 27, dialing switch 28, lead 29 and cradle switch 15*b*. Additionally, there is a direct connection via the lead 34 from the junction between the inductors 14*a* and 14*b* to the junction between the receiver and the transmitter, and there is a direct connection from the line $L_1$ to the pulsing switch 18 via the lead 35, shunt switch 17 and lead 36, it being noted that this dial shunt switch is also connected in parallel with the inductor 14 through a condenser 37.

The cradle switches are biased to remain in closed position whenever the handpiece is removed from its support, but are returned to open position by the weight of the handpiece when the handpiece is returned. The dial switches are operated by standard mechanism not necessary to show, the operation being such that as soon as a clockwise wind-up of the dial is started the on-off switch 16 is opened and the shunt switch 17 is closed, and when the dial is released to return counterclockwise to its start position the pulsing switch 18 is operated to produce as many pulses as the number of the digit being dialed (with the exception that the dialing of the number "0" provides ten pulses) and then, upon return of the dial to its start position, the on-off switch is closed and the shunt switch is opened. The pulses produced during the counterclockwise return of the dial occur every .1 second. Actually, the dial is always wound clockwise through a number of intervals greater by one than the number of the digit being dialed and the impulse springs are always disabled during return of the dial through the last interval by standard mechanism in the telephone dial. Thus, in dialing digit "1" the dial is wound through two intervals and an impulse is produced only during the first interval of return movement, and in dialing the digit "0" the dial is wound through eleven intervals and ten impulses are produced during the first ten intervals of return movement. Since the telephone line $L_1$—$L_2$ has a D.C. voltage connected thereto (not shown) and the pulsing switch 18 is connected directly across the telephone line through the shunt switch 17 during the return of the dial, the switch pulses produce corresponding current pulses in the telephone line.

The present telephone calling machine comprises means selectively operable for recording current pulses according to the operation of the pulsing switch 18 when the dial 13 is operated and for reproducing such recorded pulses to recreate corresponding D.C. pulses in the telephone line the same as when a number is dialed directly. In order that a series of telephone numbers may be recorded and be readily selected to call any of a group of subscribers' numbers, a phonographic machine of the magnetic transversal type is used for recording successive telephone numbers in code form on successive transverse lines on a long magnetic sheet or belt, a belt being preferably used as is herein shown, which is fed lengthwise by hand in the manner of the usual office list finder.

The illustrative embodiment of such calling machine shown in FIGURES 1 to 5 comprises a cabinet C having a rectangular base plate 38 and a cover 39 which is generally in the form of an inverted rectangular pan except for the provision of a ledge 39*a* at the front. The base plate has two upstanding standards 40 and 41 respectively on the front left and back left portions thereof on which are mounted transverse shafts 42 and 43 respectively. Journaled on these shafts are respective drums 44 and 45 for carrying a record medium 46 in the form of a belt. The shaft 42 has an enlarged-diameter portion 42*a* clamped at its left end to the standard 40 by a nut 47, and the drum 44 has a collar or bearing 48 staked to its left end wall and journaled on the shaft against the right shoulder of the portion 42*a*. The outer end wall of the drum is journaled at 49 on the outer end portion of the shaft. The drum is retained on the shaft by a headed screw 50 threaded into the end portion thereof.

The record belt 46 is trained around the two drums as shown, and the back drum is spring-urged rearwardly to keep the belt under tension. A mounting for the back drum for this purpose comprises a rocker arm 51 pivoted at 52 to the standard 41 (FIGURE 3) and having the shaft 43 secured to its outer end as by a crosspin 53, the rocker arm being biased rearwardly by a tension spring 54. The drum 45 is journaled on the shaft 43 in any suitable manner not herein necessary to describe.

The front drum 44 is provided with sprocket teeth 55 at each end, which engage respective rows of sprocket holes 56 in the record belt near the opposite edges thereof. The drum 44 can be turned manually by a fingerwheel 57 located between the drum 44 and the standard 40. This fingerwheel has a hub 58 journaled on the shaft portion 42*a*. One end of this hub and the confronting end of the collar 48 are provided with interengaging teeth to form a clutch 59 between the fingerwheel and the drum. This clutch is held normally engaged by a compression spring 60 interposed between the fingerwheel and the standard 40, but the fingerwheel can be shifted to the left to disengage it from the drum by means of a bell crank lever 61 pivoted at 62 to an upright boss on the frame shown in FIGURES 3 and 4. This lever has a yoke 63 at its inner end for straddling the hub of the fingerwheel and which carries pins 64 which engage a peripheral groove 48*a* in the hub. This lever is operable by a solenoid S of the pusher type having a peripherally-grooved nut 65 threaded on the outer end of the armature thereof, which is engaged by a slotted lug 61*a* turned over from an end of the lever 61.

Figure 3:
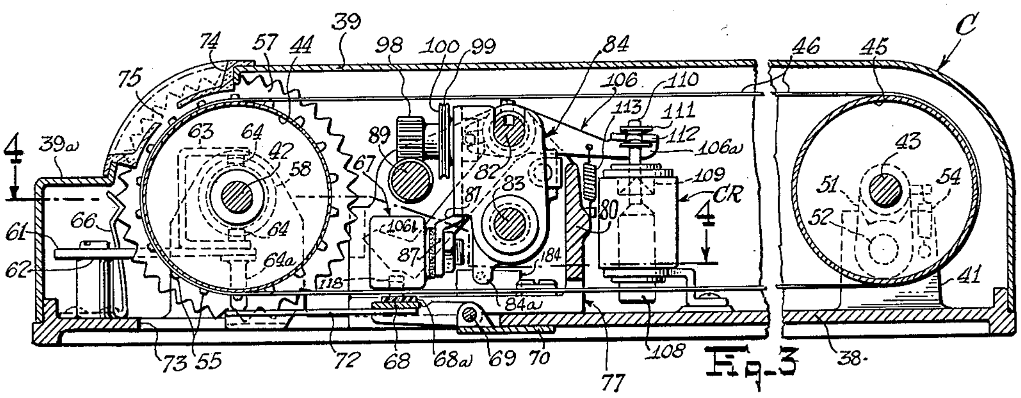
FIGURE 3 is a vertical sectional view taken substantially on the line 3—3 of FIGURE 2.

The fingerwheel has a notched periphery as shown in FIGURE 3, the number of notches being preferably the same as the number of teeth on the clutch 59. This notched peripheral surface is engaged by a cantilever-type detent spring 66 mounted on the base 38 (FIGURE 3) to define successive positions of the belt record for receiving the recordation on successive lines crosswise thereof of respective coded telephone numbers. The coded numbers are recorded on and reproduced from the inner surface of the bottom run of the belt record by a head 67 mounted for movement crosswise of the record. This is a combination record-reproduce-erase head. When the machine is conditioned for recording, as will appear, this head is provided with the usual high-frequency bias current from a source 67*a*, which source also renders the head effective to erase any prior recording in the track along which the head is moved. Below the bottom run of the record along the path of the head is a pressure plate 68 covered by a yieldable pad 68*a*, as of felt, for pressing the record into even contact with the pole face of the head. This pressure plate constitutes the cross member of a bail type of lever pivoted on a cross rod 69 carried by a bracket 70 secured at 70*a* to the base plate. The bail is urged upwardly against the record by a torsion spring 71 coiled about the rod 69 and operatively interposed between the pressure plate and the base plate. At the left end of the pressure plate there is a forwardly-extending cantilever arm 72 which terminates below a pin 64*a* depending from the yoke 63. The forward end of this arm is inclined sidewise so that when the clutch 59 is engaged to permit movement of the belt record by the fingerwheel the pin 64*a* will engage the arm 72 and hold the pressure plate displaced from the record as shown in FIGURE 3. Conversely, when the clutch is disengaged by actuation of the solenoid S—which occurs during operation of the machine as will appear—the pin 64*a* is free of the inclined face of the arm 72 to permit the pressure plate to press the record against the head under the influence of the torsion spring 71. In order to reduce the height of the machine, the base plate has an opening 73 receiving the pressure plate 68 and arm 72, as well as the lower portion of the fingerwheel. The belt record 46 comprises a film as of suitable plastic provided with an outer surface on which a list of subscribers' names or other identifications can be written as by means of a pen or pencil and be easily erased therefrom. The inner surface of this film is coated with magnetizable particles for receiving magnetic registrations or marks according to the pulses of coded subscribers' telephone numbers to be recorded. The outer surface of the portion of the belt which is trained around the front drum 44 is exposed to view through a window 74 inset in the cover 39. This window has an indexing slot 75 crosswise of the belt through which one can write the subscribers' names whose telephone numbers are recorded on the record. Also, this window has a wide front-to-back-extending slot 76 through which projects a peripheral portion of the fingerwheel 57. By manipulation of the exposed portion of this fingerwheel, the belt record can be shifted lengthwise into successive positions, defined respectively by the engagement of the detent spring 66 with the peripheral notches of the fingerwheel, to bring the subscribers' names into view through the slot 75 and at the same time to align the recorded tracks of the respective subscribers' telephone numbers with the head 67.

Figure 2:
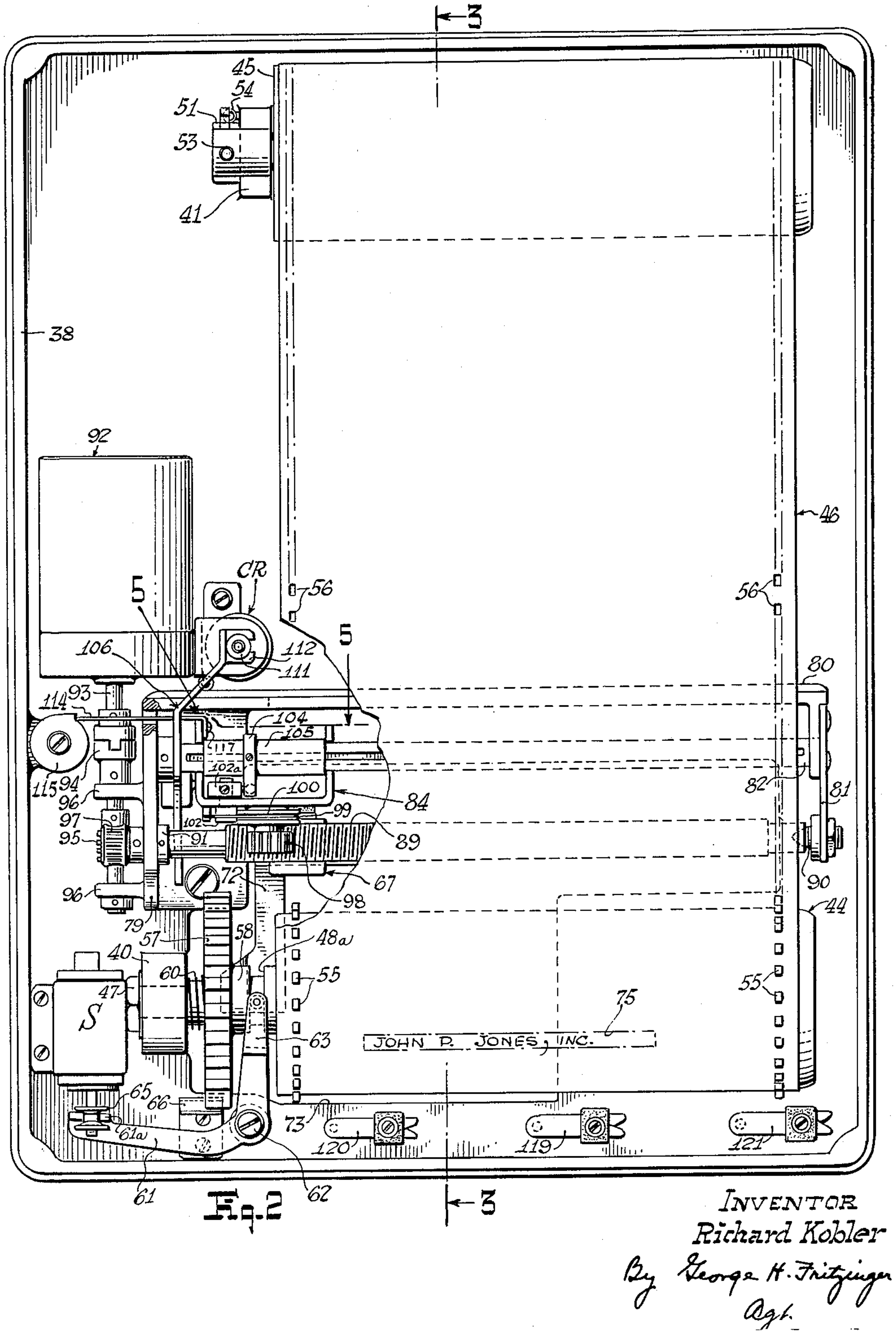
FIGURE 2 is a plan view of this machine as seen with the cover removed and with certain portions broken away.

The machine has a heavy bracket 77 secured by bolts 78 to the base plate at the left side of the record 46 intermediate the drums 44 and 45. This bracket has a vertical end wall 79 from which a cantilever arm 80 extends to the right through the space between the top and bottom runs of the belt record. Secured to the right end of this arm is a plate 81 parallel to the end wall 79. The bracket carries two parallel transverse rods 82 and 83, one above the other, which are supported at their ends by the end wall 79 and plate 81. Mounted slidably on these cross rods is a carriage 84 in the form of a U-shaped bracket supported with the opposite legs extending to the rear of the machine (FIGURE 2). The opposite legs have open-ended slots receiving the top rod 82 and have openings receiving a sleeve bearing 86 which slides on the lower rod 83. Depending from the front wall of the carriage is an arm 87 to which is secured the recorder-reproducer and erase head 67 aforementioned. This head has its recording-reproducing gap on its bottom end extending in the direction from front to back of the machine so that it can record on and reproduce from a crosswise track on the bottom run of the belt record as the carriage is driven to the right.

The carriage is driven along the rods 82 and 83 by means of a transverse feed screw 89 which at its left end has a bearing in the end plate 79 and at its right end is journaled on a cone pivot 90 carried by the plate 81, there being a collar 91 on the feed screw in abutment with the end wall 79 to form a thrust bearing for the feed screw at the left end thereof. The feed screw is driven by a motor 92 preferably of the quick-start type having a high starting torque. This motor has its drive shaft 93 coupled through a universal joint 94 to a worm 95 which is journaled in two bearings 96 integral with the end wall 79. The worm 95 meshes with a gear 97 pinned to the left end portion of the feed screw extending beyond the end wall 79.

Figure 5:
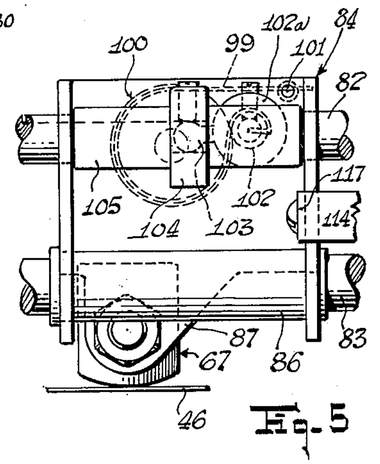
FIGURE 5 is a fractional sectional view taken approximately on the line 5—5 of FIGURE 2.

In the front wall of the carriage 84 above the feed screw there is a stud on which a circular feed nut 98 is journaled in mesh with the feed screw. This feed nut can be locked against rotation, to cause the carriage to be propelled by the feed screw, by the binding action of a flexible wire 99 drawn frictionally around a pulley 100 integral with the feed nut. The wire is secured at one end to a pin 101 on the carriage and is looped once around the pulley and wound on a drum 102 at its other end. The drum has a stub shaft journaled in the front wall of the carriage. Secured to this shaft at the back side of the carriage is a collar 102*a* positioned in front of the top rod 82. This collar has a laterally-extending radial arm provided with a ball-shaped end portion 103 (FIGURE 5). This end portion is engaged by a forked arm 104 extending forwardly from a sleeve 105 which bridges the opposite legs of the carriage and is splined to the cross rod 82. Upon turning the cross rod, the forked arm is raised or lowered to turn the drum 102 to tighten or loosen the wire 99 and thereby lock or release the circular feed nut.

The cross rod 82 is journaled at its ends in the end wall 79 and end plate 81 to permit it to be turned as abovementioned. Also, there is a bell crank lever 106 secured to the left end portion of the rod 82 for turning the rod. This lever has a rearwardly-extending arm 106*a* connected to a carriage-return solenoid CR of the pusher type. For example, as illustrated in FIGURE 3, the solenoid has an armature 108 actuatable upwardly against a stop 109 as the coil thereof is energized. Extending upwardly from this armature through a clearance hole in the stop is a rod 110, and threaded on the outer end portion thereof is a peripherally-grooved nut 111. This nut is engaged by a forked lug 112 bent over from the outer end of the arm 106*a* to provide a hinge-type connection between the armature and the arm 106*a* of the bell crank lever.

The lever 106 is urged clockwise as it appears in FIGURE 3 by a tension spring 113 connected to the arm 106*a*. Under influence of this spring the drum 102 is urged clockwise as it appears in FIGURE 5 to tighten the wire 99 about the pulley 100 and hold the feed nut normally in a locked condition. Operation of the drive motor 92 while the solenoid CR is deenergized will therefore cause the carriage 84 and the head 67 mounted thereon to be moved progressively at a uniform speed to the right. By way of example, the speed for the present purposes may be of the order of 1$^{1}/_{32}$" per second.

The carriage is urged constantly to home position by a coil spring 114 mounted in a circular housing 115 itself carried by a standard 116 upstanding from the base plate 38. One end of this coil spring leads out of the housing and is connected at 117 to the left leg of the carriage 84. So long as the feed nut 98 is locked the carriage does not yield to the return force and is moved forwardly by intervals according to the start-stop operation of the motor 92, as will appear. However, upon energization of the solenoid CR to unlock the feed nut, the carriage is returned immediately with a snap movement. When the carriage reaches its home position a depending finger 84*a* on the left side thereof strikes a button 134*a* of a switch 134 to move it into engagement with its left contact as it appears in FIGURE 7.

Since the load on the motor in the present machine does not include any record-driving means characterized typically as having considerable rotational inertia but includes only the low-inertia carriage-driving means hereinabove described, the motor will come quickly to speed. Further, in order to reduce the start-up time, a motor of the quick-start type having a high starting torque is employed. Such motor in the present machine will come to full speed typically within about 20 to 40 milliseconds.

Figure 4:
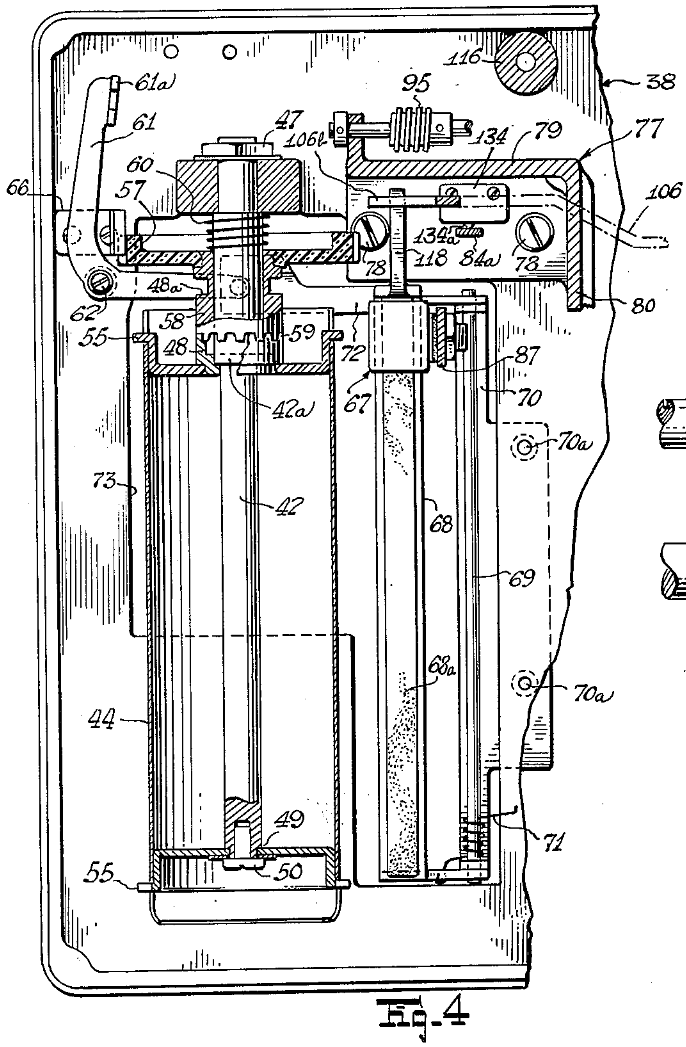
FIGURE 4 is a fractional sectional view taken substantially on the line 4—4 of FIGURE 3.

In order that the head 67 will not contact the belt record 42 under pressure while the carriage is returned to home position, the pressure plate 68 is cammed downwardly as the solenoid CR is actuated by means of a second arm 106*b* of the bell crank lever 106, there being for this purpose a leftwardly-extending arm 118 on the bail, as shown in FIGURES 3 and 4, against which the arm 106*b* impinges as the lever 106 is turned counterclockwise by the solenoid CR.

Figure 1:
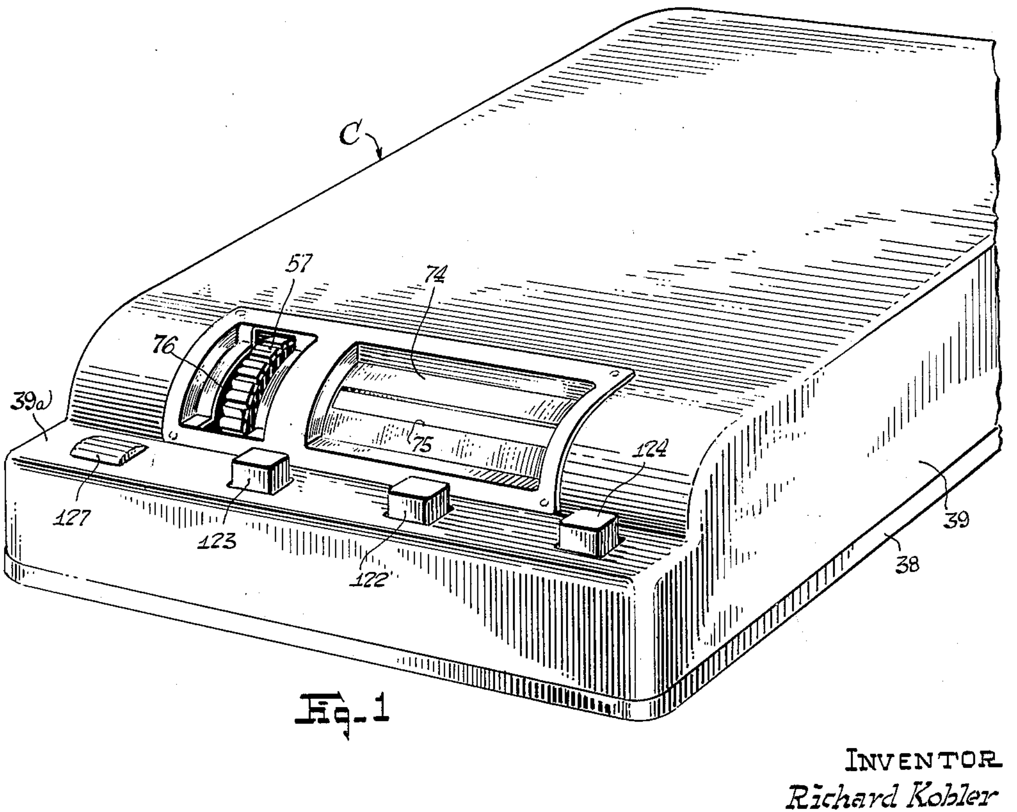
FIGURE 1 is a perspective view of an automatic calling machine in which my invention is incorporated.

For an understanding of the operation of the machine, reference is had next to the schematic diagram of FIGURE 7. As here shown, the machine has a record switch 119, a restoration switch 120 and a reproduce or calling switch 121. These switches are operable selectively by depressing respective buttons 122, 123 and 124. These buttons project upwardly through respective clearance holes in the ledge 39a of the cover 39 as shown in FIGURE 1. As will appear, upon pressing the record button, a signal light 126 comes on and is visible through a window 127 in the ledge 39a.

Upon pressing the record button, the machine is conditioned to record selected telephone numbers in code form as the numbers are dialed on the dial 13 of the user's telephone set. The sequence of operations is as follows: Upon momentarily pressing the record button 122, a record relay RR is activated from a voltage source 123 through a lead 129, switch 130 of a playback relay PR now not activated, lead 131, record switch 119, lead 133, and carriage end switch 134 via the left contact thereof to ground, the switch 134 being now held operated by abutment of the lug 84a of the carriage against the push-button 134a as indicated. Operation of the record relay RR (1) closes a switch 136 to complete a holding circuit for the relay via the lead 129, switch 130, switch 136 and switch 120 to ground, thereby causing the record relay RR to stay activated after release of the record button, (2) closes switch 137 to light the lamp 126 from the voltage source 138, (3) closes switch 139 with its lower contact to prepare a circuit for a delay relay DR through a motor-controlling pulsing switch 140 operable by the dial 13 on the telephone box, the circuit being via lower contact of switch 139, lead 141, upper contact of switch 142 of relay DR, lead 143, pulsing switch 140, lead 144, upper contact of switch 145 of relay DR, lead 146 and coil of the relay DR to voltage source 147, (4) moves the switches 23 and 26 to their lower contacts to disconnect the dial pulsing switch 18 from the telephone line $L_1$—$L_2$ and connect the same to the input of an amplifier 148 preferably of the transistorized type, the input circuit being from ground through the amplifier input, switch 23, lead 24, pulsing switch 18, lead 25, switch 26 and ground 30, (5) closes a switch 302 before switches 23 and 26 break with their upper contacts to maintain continuity of the telephone circuit while the dial pulse switch 18 is transferred to the calling machine, and (6) closes switch 31 to connect a low-frequency oscillator 32 of about 200 cycles per second through a voltage cutdown resistor 33 to the amplifier input. Since the pulsing switch 18 is normally closed, it now simply places a short across the input of the amplifier without allowing the oscillator to feed any signal thereto. As will appear, by transferring the pulsing switch 18 to the calling machine and maintaining continuity of the telephone circuit, the user may record a telephone number while he has connection with a called subscriber.

Figure 6:
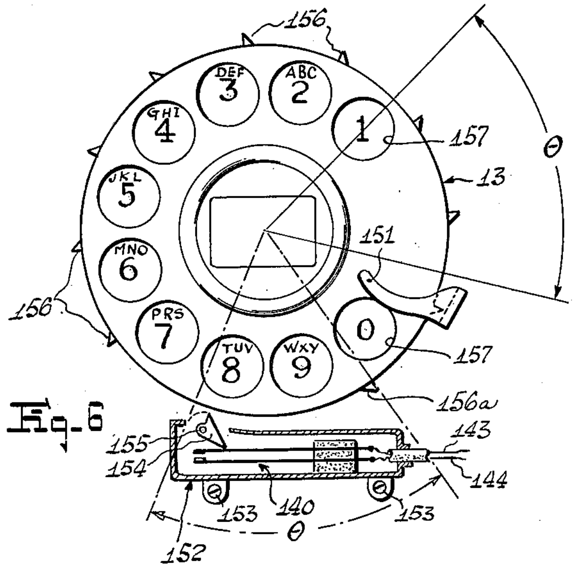
FIGURE 6 is a view of a telephone dial with a switch attachment for controlling the start-stop operation of the calling machine.

Upon dialing a letter or digit of a telephone number the dial is first wound in a clockwise direction from the particular letter or number until the finger, starting from the hole in the dial at that letter or number, strikes the stop 151 shown in FIGURE 6, and then the dial is released to return at uniform speed to its start position. The pulsing switch 18 is operated during the return of the dial except through the last 100 millisecond interval by standard telephone mechanism hereinbefore described but not herein necessary to show.

The motor-control pulsing switch 140 is operated similarly as by a mechanism shown in FIGURE 6. This switching mechanism comprises a housing 152 secured as by screws 153 to the telephone box by the side of the dial 13. Mounted insulatedly in the housing are the springs 140 forming the pulsing switch, and a pawl 154 pivoted at 155 and biased to a mid-position by a suitable spring means not shown. The outer end of this pawl projects out of the housing and engages the rim of the dial 13, and on this rim there are provided a series of teeth 156, there being one for each hole 157 in the dial, the first tooth 156a being so positioned that it just passes the pawl when the digit "1" is dialed. Upon winding the dial clockwise, the successive teeth kick the pawl counterclockwise in directions away from the adjacent switch member 140 but upon return of the dial the teeth kick the pawl clockwise against this switch member to close the switch 140 once for each digit dialed but without impulsing the switch 140 during the last 100 millisecond interval of return movement, the same as the impulse switch 18 is not operated during the last 100 millisecond interval, as before-described. It will be seen, therefore, that the operation of the dial pulsing switch 18 and of the motor-control pulsing switch 140 is independent of how much delay may be exercised in winding up the dial or of how long the subscriber may hold his finger against the finger stop 151 between digits since the operation of these switches is a uniform, controlled one occurring only during the return of the dial. Although the on-off switch 16 and the shunt switch 17 are operated at the outset of dial wind-up, they are not now connected in the operating circuit.

Alternatively, the motor pulsing switch may be installed in the telephone box and be operated by a dial mechanism of the so-called "spotter" type (well known in the telephone art) which is modified only to provide a series of pulses as the dial is returned from an operated position to home position.

Figure 8:
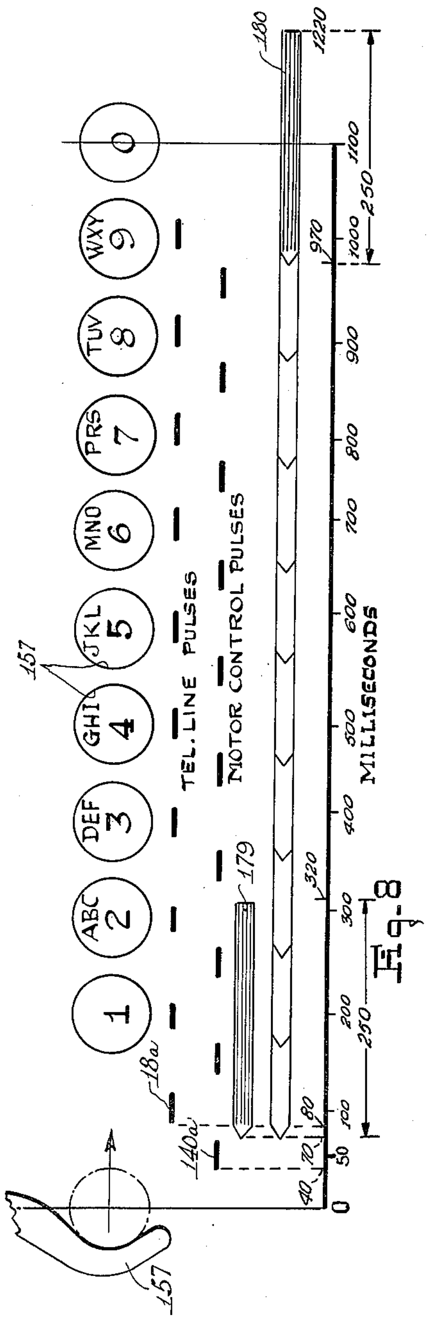
FIGURE 8 is a diagrammatic representation on a time basis of the pulses which occur when a selected letter or digit is dialed.

Since the last of the teeth 156 corresponding to the letter or digit being dialed has just cleared the pawl 154 when the finger reaches the stop 151, it follows that the motor-control pulsing switch 140 will be closed by the initial return movement of the dial, typically within about 30 to 40 milliseconds following the release of the dial as indicated by the mark 140a in FIGURE 8. On the other hand, the mechanism operating the dial pulsing switch 18 is adapted to cause this switch to be opened initially in about 80 milliseconds after release of the dial as indicated by the mark 18a in FIGURE 8. Thereafter, these switches are pulsed in their relative timing at a rate of 10 times per second until the dial is returned, the duration of each pulse being typically from 15 to 40 milliseconds. Since the drive motor 92 is of the quick-start type and drives only the feed screw having no rotational inertia, it will come to speed well within the 40-millisecond interval between the initial closing of the motor-control switch 140 and the subsequent opening of the pulsing switch 18.

As soon as the motor-control switch 140 is closed the motor relay MR is momentarily activated through the upper contact of switch 163, and the motor 92 is started by the closing of switch 173 of this motor relay. Furthermore, the preparatory circuit for the relay DR is completed to cause this relay to be operated. Operation of this relay produces the following results: (1) switch 145 is closed with its lower contact to complete a holding circuit for the relay through lead 141 and the lower contact of switch 139 of the RR relay to ground, (2) switch 158 is opened to remove a possible operating circuit for the CR relay via lead 159, switch 160 of the playback relay PR and the right contact of the carriage end switch 134, this being the contact with which the switch makes when the carriage is out of home position, (3) the motor relay MR is kept activated from source 161 through lead 162, lower contact of switch 142, motor pulsing switch 140 and lower contact of switch 163 of relay DR to ground, (4) switch 164 is closed to prepare a second operating circuit for the motor 92 through lead 165 and upper contact of switch 139 of record relay RR to ground, (5) switch 88 is closed to connect the high-frequency bias-erase oscillator 67a to the head 67, (6) switch 166 is closed to provide power to the amplifier 148 to render it immediately operative (since it is of the transistorized type) through a circuit leading from the source 167, the amplifier, lead 168, and the switch 166 to ground, (7) solenoid S is activated from source 167a through the same switch 166 to ground, operation of this solenoid causing the fingerwheel 57 to be disengaged from the record drum 44 and causing the pressure plate 68 to be released against the record to press it against the head 67, (8) switch 169 is shifted from its upper to its lower contact to disconnect the head 67 from the amplifier input and connect the same to the amplifier output so that the head will operate as a recorder, (9) switch 172 is opened to disconnect a dialing relay DP from the output of the amplifier so that the same will not be operated during recording, and (10) the switch 301 is opened to prevent operation of the playback relay PR, for example, so that the record relay RR will not be dropped out by the opening of the switch 130.

Operation of the motor relay MR which occurs the instant the switch 140 is first closed upon release of the dial closes contacts 173 to supply power to the motor 92 from the source 174 through the lead 175, switch 173 and ground. Also, it closes switch 176 to shunt the restoration switch 120 through the lead 177 whereby to assure against the holding circuit for the record relay RR being opened by accidentally pressing the restoration button 123 while the machine is in recording operation. The closing of the motor switch 173 immediately starts the motor to drive the carriage 84 to the right, causing the subsequent pulse of oscillation fed to the amplifier from the oscillator 32 during the interval the pulsing switch 18 is open to be recorded on the record 46 by the head 67. In view of a condenser 178 being connected across the motor relay MR, drop-out of this relay after the motor-control pulsing relay opens is delayed typically by about .25 second. Since the pulses recur every .1 second during return of the dial 13 as is indicated in FIGURE 8, the relay MR stays operated until the dial is returned home and then drops out about .25 second after the last pulsing of the switch 140 as indicated by the line 179 in FIGURE 8. Thus, upon dialing each letter or digit the motor runs continuously for an interval, starting about 40 milliseconds after the dial is released and ending .25 second after the last pulsing of the motor switch 140, which is about 130 milliseconds after the dial is returned assuming each pulse of the motor switch 140 to have 40 milliseconds duration. (For example, on dialing the digit "1" the dial is returned home 120 milliseconds after the signal pulse of the motor switch 140 ends, and the motor relay MR drops out 250 milliseconds after the signal pulse of the motor switch 140, which is therefore 130 milliseconds after the dial is returned.) Thus, when dialing the number "0" the motor runs until nearly 1.23 seconds after the instant the dial is released from its operated position as indicated by the line 180 of FIGURE 8.

If the number "1" were dialed several times in succession, there would be recorded along a line 181 crosswise of the record (FIGURE 9) successive individual pulses 182 of a signal of 200 c.p.s., each separated by an interdigital interval of .25 second—the drop-out time of the relay MR. On the other hand, if the number "0" were dialed several times in succession, there would be recorded successive trains 183 each of 10 pulses for a duration of 1 second, and the successive trains would again be separated by interdigital intervals of .25 second, as illustrated also in FIGURE 9. Since the head travels only about $^{11}/_{32}''$ per second, the distance of head movement for each full dial return is only of the order of .43″. Thus telephone numbers of as many as ten letters or digits can be recorded on a belt record having a width of only about 5″.

At the end of recording a particular telephone number the machine remains in recording condition, with the carriage standing in its position of farthest advance across the record. Before another number can be recorded or before any number can be reproduced, the machine must be restored to a neutral condition with the carriage returned to its home position. Such restoration is accomplished by pressing the button 123 of the restoration switch 120. When the button 123 is pressed, power is removed from the record relay RR by the opening of the switch 120 to cause this relay to drop out. This causes the following operations to occur: (1) switch 136 is opened to break the hold circuit for the relay, (2) switch 137 is opened to put out the light 126, (3) switches 23 and 26 are returned to their upper contacts to return connection of the dial pulsing switch 18 from the machine to the telephone line, (4) switch 31 is opened to disconnect the oscillator 32 from the amplifier, and (5) switch 139 is returned to its upper contact to break the hold circuit for the relay DR and cause thereby this relay to drop out.

Figure 9:
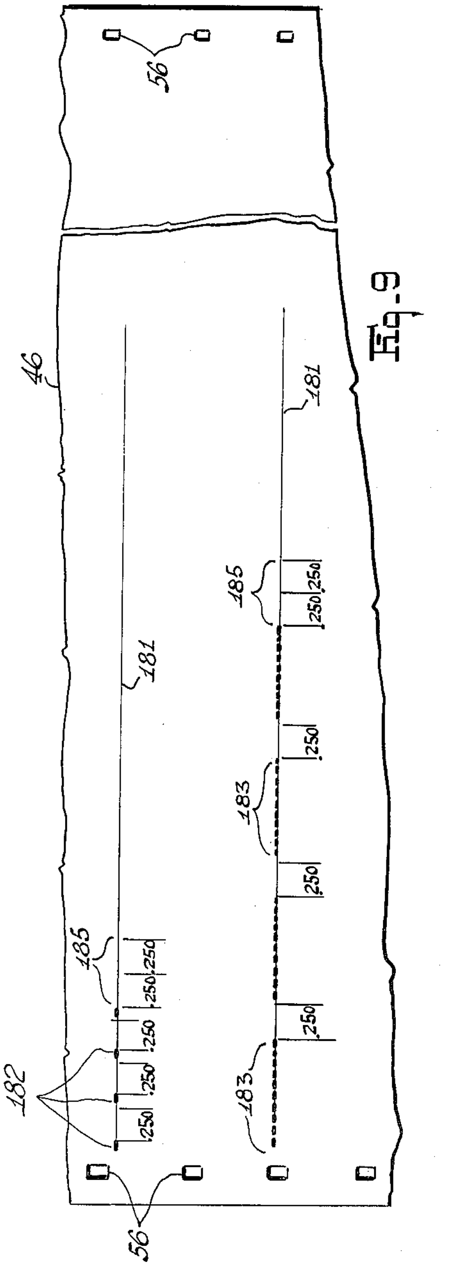
FIGURE 9 is a visual representation to enlarged scale of the successive magnetic pulses which are recorded on the record medium when the digit "1" is dialed repeatedly and also when the digit "0" is dialed repeatedly.

It is a feature of the invention, however, to delay the drop-out of the relay DR by about .25 second by placing a condenser 184 thereacross. During this delay interval the motor 92 has a second operating circuit via lead 165, switch 164 of relay DR, and upper contact of switch 139 of relay RR to ground. This causes the carriage to be advanced a further distance corresponding to a .25-second time interval before the carriage drive is disengaged to permit immediate return of the carriage under influence of the return spring 114. During such further advance, no signal is being recorded because the oscillator 32 is now disconnected from the amplifier but erase current from the oscillator 67*a* is still being fed to the head by reason of the switch 88 being still closed, with the result that the head 67 acts only as an eraser during this further advance. Thus, if any longer telephone number had been previously recorded in the same track, there will be provided a signal-free distance 185 of a length equivalent to, for instance, .5 second at the end of the telephone number just recorded, as shown in FIGURE 9. The reason for providing this extra-long signal-free path at the end of the recording of a telephone number is to cause automatic drop-out of the play-back relay PR soon after the telephone number has been reproduced so that the machine will not proceed onwardly to reproduce any remaining portion of any longer telephone number that may have been previously recorded in the same track. This operation will be understood from the subsequent description.

When the relay DR drops out the following results occur: (1) switch 169 is restored to its upper contact to connect the head 67 to the amplifier input so that the head will now operate as a reproducer, (2) switch 88 is opened to disconnect the high-frequency oscillator 67*a* from the head and render the head ineffective as an eraser, (3) switch 172 is closed to connect the playback relay PR and the dialing relay DP to the amplifier output, (4) switch 166 is opened to remove power from the amplifier so that no recording or reproducing can take place during the carriage return, and also to restore the solenoid S to place the belt record again under control of the fingerwheel 57 and remove pressure of the record from the head 67, (5) switch 163 is returned to its upper contact to disable the circuit of the motor-control pulsing switch 140, (6) switches 145 and 142 are returned to their upper contacts to restore the preparatory circuit of the relay DR, (7) switch 164 is opened to drop out the motor relay MR, (8) the switch 301 is closed to prepare a circuit for activating the playback relay PR, and (9) switch 158 is closed to activate the solenoid CR via the circuit from the source 186, switch 158, lead 159, switch 160 of the relay PR, and the right contact of the carriage end switch 134 in view of this switch being now in its rightward position because of the carriage being out of home position. Activation of the solenoid CR displaces the pressure plate 68 to remove pressure of the record from the head 67 and unlocks the circular feed nut 99 to cause the carriage to be returned immediately to home position under influence of the return spring 114.

The operation of the machine for recording a telephone number is therefore as follows: The user will write the name or other identification of a subscriber on the record 46 through the slot 75, press the record button and then dial the number of that subscriber. Next, he will press the restoration button, shift the fingerwheel by one notch, write in a second subscriber's name whose number is to be recorded, then dial that number. Next, he will press the restoration button, and repeat this process until the numbers of the desired list of subscribers are recorded. Should the user later wish to remove a subscriber's number and put another number in its place, he will turn the fingerwheel until the name of the old subscriber's number appears, erase that name and write in the name of the new subscriber, and then press the record button and dial the new number. When this is done, the head 67 erases the code signals of the old number and records the code signals of the new number. This feature of the present machine which permits new numbers to be recorded in place of old numbers simply by recording the new number in the same track as the old fulfils a practical necessity for automatic calling machines not heretofore readily accomplished by the prior machines. Any user of automatic calling machines is confronted constantly with the problem of changed telephone numbers and of changing lists of subscribers to be called arising from changing conditions in one's business. The present machine enables the user to keep the machine up to date with such changing requirements, without disturbing the machine itself or its connection with the telephone line at any time.

When a user is to call a subscriber he must check first whether the machine is in a restored condition—that is, whether the light 126 is out. If the light is on he must first press the restoration button 123. Among other things this will return the carriage to home position and shift the hold switch 134 to its left contact as it appears in FIGURE 7. Thereupon, he will turn the fingerwheel 57 until the subscriber's name who is to be called appears in the slot 75. This will align the recorded telephone number of that subscriber with the head 67. Thereupon the user lifts the handset from the cradle support to complete the telephone circuit and momentarily presses the playback button 124. When the playback button is pressed, the switch 121 is shifted to its lower contact to break the circuit of a condenser 189 from a voltage source 190 and to connect this charged condenser across the playback relay PR via lead 191 and the upper contact of switch 300, the effect of which is to operate the relay by the discharge of the condenser.

Operation of the playback relay causes the following results to occur: (1) the switch 300 connects the playback relay PR to the output of the amplifier 148, (2) it opens the switch 130 to prevent operation of the record relay RR should the record button 122 by now accidentally depressed, (3) it opens switch 160 to prevent any possible operation now of the carriage return solenoid CR, (4) it closes switch 193 to complete the circuit of the dialing relay DP across the output of the amplifier, (5) it closes a switch 194 to activate the amplifier 148 and solenoid S to disengage the clutch 59 and to restore the pressure plate 68 against the record, (6) it closes switch 195 to start the motor 92, and (7) it closes switch 196 to complete a direct connection of the pulsing switch 28 of the dialing relay DP across the telephone line $L_1$—$L_2$ via the hook switch **15*b***.

Thus, as an incident to the operation of the playback relay PR, the machine starts running to advance the head 67 across the record to reproduce the recorded signals. The output of the amplifier 148 feeds now into the relay DP to pulse the switch 28 in accordance with the pulses being reproduced from the record and also it feeds into the relay PR to maintain this relay operated. To assure steady operation of the relay PR during this period, it is slugged to have a delayed drop-out so that its release time is greater than .25 second but less than .5 second. Thus, the PR relay is held operated throughout the interdigital .25 second intervals to keep the machine operating until the complete coded number is reproduced; however, when the reproducer enters the .5 second unrecorded area at the end of the recorded telephone number the PR relay will drop out to cause the following to occur: (1) switch 130 is closed to restore the machine to an operable condition for recording, (2) switch 160 is closed to operate the CR relay via the right contact of the end switch 134 (in view of the carriage being now out of home position) to cause the carriage to be returned, (3) the switch 193 is opened to disable the DP relay, (4) switch 194 is opened to drop out the solenoid S to reconnect the finger-wheel with the record support and release the pressure plate from the record, and also to cut off the power to the amplifier 148, (5) switch 195 is opened to stop the motor, (6) the switch 300 disconnects the relay PR from the amplifier and prepares the same for the next operation, and (7) switch 196 is opened to remove the shunt from the operating components of the telephone set—i.e., from the induction coil 14, receiver R and transmitter T—whereby to restore the telephone set to operable condition. Thus, immediately upon completion of the calling of a number by the machine, the machine is restored to its start condition and the telephone is restored to a normal operating condition to enable the user to talk to the called subscriber. Also, the machine is now in its normal condition by which subscribers may be dialed directly, if desired.

It is to be understood that the invention comprehends that the calling machine may itself be provided with a dialing mechanism to reduce the number of wires between the machine and the telephone as well as to permit the recording of telephone numbers independently of the telephone equipment. Such dialing mechanism would include the usual dial pulsing switch and would be of the spotter type for control of the drive motor as before explained, but would not include the usual on-off and shunt dial switches. The telephone box 10 would in this case be standard and the only connections between the machine and telephone would be the two wires for connecting the automatic dialing switch 28 serially in the telephone circuit.

The language herein used of providing a blank, unrecorded or erased space on the record is intended to mean that such space is free of recorded digit- or letter-representing signals but may have thereon a recorded signal of a frequency substantially different from that of the digit- or letter-representing signals such as a so-called erase signal.

Other changes and modifications may be made in the illustrative embodiment of my invention herein particularly shown and described without departing from the scope of my invention, which I endeavor to express according to the following claims.

I claim:

1. In a machine for recording coded telephone numbers: the combination of a support for a record medium, a recording head, drive means for producing a relative traveling movement between said head and record medium, a telephone dialing mechanism for producing signals representing coded telephone numbers as the numbers are dialed, said dialing mechanism including a rotary dial biased to a home position and movable from said home position by respective distances according to digits and letters to be dialed, a first pulsing switch recurrently operated during each return of the dial to home position for producing pulse signals of coded telephone numbers and including a second pulsing switch also recurrently operated during each return of said dial, said second pulsing switch being timed to operate ahead of said first pulsing switch; means for controlling said drive means by said second pulsing switch to cause said drive means to start prior to the feed of said pulse signals to said recording head; and timing means to stop said drive means upon elapse of a predetermined time interval following each return of the dial to home position.

2. In a system including a telephone line and a telephone set connected thereto having a dial and a pulsing switch controlled thereby for producing pulse signals representing coded telephone numbers: the combination of a machine including a support for a record medium, a record medium and means for recording coded telephone numbers on said record medium as the numbers are dialed; conditioning means for selectively placing said machine into recording condition and into another condition; means responsive to the placing of said machine into recording condition for disconnecting said pulsing switch from the telephone line and connecting the same to said machine; and means responsive to said conditioning means for returning connection of said pulsing switch to the telephone line when the machine is restored to said other condition.

3. The apparatus set forth in claim 2 wherein said conditioning means includes means operable for placing the machine in condition for reproducing, a dialing switch connected in said telephone line, means for operating said dialing switch according to the recorded pulses of a coded telephone number when said number is reproduced whereby to recreate in said telephone line the same pulse signals as when said telephone number is dialed directly, said dialing switch being connected in said telephone line in series with components including an inductor coil of the telephone set, and switch means in said machine operated as said machine is conditioned for reproducing for shunting said components to mute the telephone set and provide a direct connection of the dialing switch across the telephone line.

4. In apparatus for recording and for transmitting coded telephone numbers to a telephone line: the combination of a dial and of switch means controlled thereby; means controlled by said switch means for producing successive trains of oscillations in timed relation with the operation of said switch means as a telephone number is dialed; a machine including a record medium and a record-reproduce head selectively operable for recording said oscillations on said medium and for reproducing the same therefrom; a dialing means having a switch connected to the telephone line for producing trains of D.C. pulses representing the respective digits of a telephone number; and means for intermittently operating said dialing means by the oscillations reproduced from the record when said machine is operated as a reproducer.

5. In a telephone calling system: the combination of a telephone dial mechanism; a machine having means for recording and reproducing coded telephone numbers including means for supporting a record medium, and a record-engageable head operable relative to the record medium; and means for recording coded telephone numbers as said numbers are dialed, including drive means for producing a relative movement between the record medium and said head, means for starting said drive means upon each operation of said dial, and timing means for maintaining operation of said driving means for a predetermined interval after each return of said dial to home position.

6. The apparatus set forth in claim 5 including means started a predetermined interval after each release of said dial from operated position for producing signals representing selected letters and digits of telephone numbers, and switch means operated by said dial within said predetermined time interval following each release thereof for starting said drive means.

7. In a machine for recording coded telephone numbers: the combination of a record medium, a record-cooperable recording head, a drive for producing a relative traveling movement between said record medium and head including a motor and a disengageable drive transmission, means for relatively shifting said record medium and head in directions transverse to said traveling movement to place said head in registration with successive tracks on the record medium, dial means for dialing telephone numbers, means responsive to each dialing of a digit or letter of a telephone number for starting said drive means and feeding dialing signals to said head and then stopping the drive means to leave the head in its position of advance along a respective track on the record medium, and spring means responsive to disengaging said drive transmission for producing a relative movement between said head and record medium to return the head along the respective track to home position.

8. The machine set forth in claim 7 wherein said dial means is part of a telephone set and includes a dial pulsing switch normally connected in the telephone circuit, including means for disconnecting said pulsing switch from the telephone circuit and connecting the same to the input of said machine; and means for concurrently returning connection of said pulsing switch to the telephone circuit and for returning said head to home position.

9. In a telephone number recording machine; the combination of a telephone dial mechanism; a magnetic record medium; a record cooperable magnetic head; drive means for moving said head relative to the record medium; means responsive to the dialing of each digit or letter of a telephone number for starting said drive means upon release of the dial from an operated position and feeding coded signals of the respective letter or digit to said head during return of the dial, including timing means for maintaining operation of said drive means for a predetermined interval after the return of the dial to home position; a source of erase current; and means for feeding said erase current to said head to cause the same to operate as an eraser during said predetermined interval whereby to produce unrecorded spaces on the record between successive digits and letters.

10. In a telephone-number recording machine adapted to be connected to a telephone set and having a dial means for producing signals representing coded telephone numbers: the combination of means for supporting a magnetizable record medium for shifting movement; a record-cooperable record-erase head; a source of erase current connected to said head; drive means for advancing said head relative to said record medium; means controlled by said dial means as a telephone digit or letter is dialed for starting said drive means and feeding coded signals to said head as the head is advanced, including timing means for stopping said drive means a predetermined interval after each return of the dial to home position; means for returning said head to home position; and means operable to disconnect said source of erase current from said head and to render effective said returning means in the sequence here named.

11. In a machine for recording coded telephone numbers: the combination of a movable magnetic record medium; a movable record-cooperable magnetic translating head for erasing any prior signal recorded on the record medium and for concurrently recording signals fed thereto as the head is moved relative to the record; a start-stop drive means for progressively advancing the head relative to the record medium; a telephone dial mechanism; means responsive to the dialing of each digit or letter of a telephone number for starting said drive means and forwarding coded signals of the respective letter or digit to the head, including timing means for maintaining operation of the drive means until a predetermined interval after return of the dial to home position whereby coded signals of successive digits and letters are recorded with unrecorded spaces therebetween; means manually operable to momentarily start said drive means and cause the same to be activated for a predetermined greater interval with the said head operating only as an eraser; and means responsive to elapse of said last-stated predetermined interval for rendering said head inoperative and returning the head and record medium into their initial positional relationship.

12. In combination: a telephone dialing mechanism including a pulsing switch; a recording machine adapted to operate also as a reproducer; an oscillator; a circuit connected to said oscillator and controlled by said pulsing switch for feeding pulses of oscillations into said recording machine for recordation thereby as a telephone number is dialed; means for shifting said machine from a recording condition into reproducing condition for reproducing said recorded pulses of oscillations; a relay including a switch adapted to be connected into a telephone circuit; and means for connecting the coil of said relay to the output of said machine when the machine is operated as a reproducer for causing the switch of the relay to be pulsed in accordance with the operation of the pulsing switch of said dial mechanism when the coded telephone number being reproduced was recorded.

13. In a system including a telephone set connected to a telephone line: the combination of a dialing mechanism in said telephone set including a pulsing switch controlled thereby for producing pulse signals representing coded telephone numbers as the numbers are dialed; a machine for recording said pulse signals of coded telephone numbers; and a unitary switch device including a first switch means for shunting said pulsing switch and a second switch means for thereupon disconnecting the pulsing switch from the telephone set and connecting the same to said recording machine whereby said pulsing switch is disconnected from the telephone line and connected to the recording machine without breaking the telephone line.

14. In a machine for recording and reproducing telephone numbers: the combination of a record medium, a record-reproduce head, means mounting said record medium and head for relative shifting movement in one direction and for relative traveling movement in another direction, means for relatively shifting said record medium and head by steps to place said head in registration with successive tracks on the record medium, a drive for producing a relative traveling movement between said record medium and head, conditioning means for placing said machine selectively into respective operative conditions for record and reproduce and into a neutral condition, a dial mechanism, means for starting said drive means by said dial mechanism when said machine is in record condition, and means responsive to operating said conditioning means to place said machine into a predetermined one of said operating conditions for disabling said shifting means.

15. In a machine for recording and reproducing telephone numbers: the combination of a record medium, a record-reproduce head, means mounting said record medium and head for relative shifting movement in one direction and for relative traveling movement in another direction, means for relatively shifting said record medium and head by steps to place said head in registration with successive tracks on the record medium, a drive for producing a relative traveling movement between said record medium and head, conditioning means for placing said machine selectively into record and reproduce conditions, a dial mechanism, means for starting said drive means by said dial mechanism when said machine is in record condition, means for starting said drive means when said machine is in reproduce condition, and means responsive to starting said drive means for disabling said shifting means.

16. In combination, a source of signals, a manual dialing device selectively operable to code the signals from said source to represent respective letters and digits of telephone numbers; a recording machine including a record medium, a recording head and drive means for producing a relative progressive movement between said head and record medium; and means including timing means responsive to each selective operation of said dialing device for starting said machine to record the coded signals corresponding to the selected letter or digit and to provide a timed interdigital movement between the head and record medium of predetermined duration without recordation of any digit- or letter-representing signal.

17. The combination set forth in claim 16 including a source of signals of different frequency from that of said first mentioned source for use as an erase signal, and means responsive to each selective operation of said dialing device to cause the signals from said two mentioned sources to be fed to said head in a predetermined sequence respectively for recording and erasing with said erasing taking place during said timed interdigital movement between said head and record medium.

18. In a machine for recording coded telephone numbers: the combination of a support for a record medium; a recording head; drive means for producing a relative traveling movement between said head and record medium; a telephone dialing mechanism selectively operable for producing dial signals representing coded telephone numbers as the numbers are dialed; and means responsive to said dialing mechanism upon each release of the dialing mechanism from an operated position for starting said drive means and feeding to said recording head the respective dial signals representing the number dialed.

19. The recording machine set forth in claim 18 wherein said dialing mechanism includes a rotary dial spring biased to home position and means for producing dial signals during each return of the dial from an operated position, and timing responsive to said dial reaching home position for stopping said drive means upon elapse of a predetermined interval.

20. In a machine for recording coded telephone numbers: the combination of a movable record medium; a movable record-cooperable magnetic translating head for erasing any prior signal recorded on the record medium and for concurrently recording signals fed thereto as the head is moved relative to the record; a start-stop drive means for progressively advancing the head relative to the record medium; a telephone dial mechanism; means responsive to the dialing of each digit or letter of a telephone number for starting said drive means and for feeding coded dial signals of a respective letter or digit to said head, including timing means to provide a timed interdigital movement between the head and record medium with said head operating as an eraser whereby successive digits or letters are recorded on the record medium with unrecorded interdigital spaces therebetween; means manually operable independently of said dialing mechanism for starting said drive means to advance said head with the head operating as an eraser; and timing means responsive to said manually operable means when the head has been advanced through a predetermined distance substantially greater than said respective interdigital spaces for stopping said drive means.

21. In a machine for recording and reproducing telephone numbers in code form: the combination of an elongate, flexible record medium having a magnetic coating for the recordation thereon and reproduction therefrom of signals representing coded telephone numbers, movable supporting means for said record medium permitting movement of the record medium lengthwise thereof, means for shifting the record medium lengthwise thereof into successive positions, means for detenting the record medium in said respective positions, a magnetic head engaging said record medium under pressure and mounted for movement transversely of the record medium, means operable while the record medium is at standstill for driving said head to record on and reproduce from the record medium along tracks corresponding to the respective positions of the record medium lengthwise thereof relative to said head, and control means to cause said head to be disengaged from said record medium during operation of said shifting means.

No references cited.